United States Patent [19]

Koller

[11] Patent Number: 4,599,909
[45] Date of Patent: Jul. 15, 1986

[54] LINEAR TRANSFER DRIVE FOR A PICK AND PLACE MATERIAL HANDLING APPARATUS

[75] Inventor: Frank H. Koller, Norridge, Ill.

[73] Assignee: Emerson Electric Co., St. Louis, Mo.

[21] Appl. No.: 435,312

[22] Filed: Oct. 19, 1982

[51] Int. Cl.[4] ............................................. F16H 25/08
[52] U.S. Cl. ............................................. 74/27; 74/53; 74/567; 901/16
[58] Field of Search ....................... 74/27, 53, 54, 567, 74/569; 414/749, 751, 753, 589; 901/16

[56] References Cited

U.S. PATENT DOCUMENTS

| | | | |
|---|---|---|---|
| Re. 29,797 | 10/1978 | Mink ................................ | 214/1 BD |
| 1,948,558 | 2/1934 | Beutel ............................. | 414/749 X |
| 2,911,114 | 11/1959 | Gartner ........................... | 414/751 X |
| 3,034,663 | 5/1962 | Crosby et al. ................... | 414/749 X |
| 3,212,650 | 10/1965 | Sharpe et al. ................... | 414/753 X |
| 3,353,417 | 11/1967 | Nebendorf et al. ............. | 74/53 |
| 3,525,268 | 8/1970 | Kenny . | |
| 3,703,834 | 11/1972 | Beezer ............................ | 74/57 |
| 3,751,996 | 8/1973 | Beezer ............................ | 74/53 |
| 3,779,089 | 12/1973 | Beezer ............................ | 74/53 |
| 3,865,253 | 2/1975 | Healy .............................. | 214/1 BT |
| 3,881,362 | 5/1975 | Beezer ............................ | 74/53 |
| 3,964,357 | 6/1976 | Fetzner .......................... | 74/53 X |
| 3,988,938 | 11/1976 | Nagai ............................. | 74/53 |
| 4,146,924 | 3/1979 | Birk et al. ...................... | 901/16 X |
| 4,289,040 | 9/1981 | Haluko, Jr. ..................... | 74/50 |
| 4,329,866 | 5/1982 | Babbitt ........................... | 414/751 X |
| 4,416,165 | 11/1983 | Kramer et al. ................. | 74/820 X |
| 4,487,085 | 12/1984 | Collins ............................ | 74/113 |

FOREIGN PATENT DOCUMENTS

| | | | |
|---|---|---|---|
| 0067707 | 6/1914 | Austria ........................... | 74/53 |
| 1222759 | 8/1966 | Fed. Rep. of Germany ... | 74/53 |
| 0229142 | 7/1969 | U.S.S.R. ........................ | 74/54 |

*Primary Examiner*—Rodney H. Bonck
*Attorney, Agent, or Firm*—Tilton, Fallon, Lungmus & Chestnut

[57] ABSTRACT

A compact intermittent, linear motion transfer drive mechanism for a pick and place material handling apparatus incorporating a pair of oscillating crank arms for imparting motion along mutually perpendicular axes to linearly movable shaft members capable of imparting a desired motion sequence and positioning to work pieces coupled thereto in response to rotational movements of plate cam members mounted for rotation about a common, fixed-axis input shaft and wherein the cam members are arranged in parallel cooperating pairs, each cam being engaged by an associated follower roller rotatably carried on a follower crank shaft supported on an eccentrically adjustable axis to regulate follower-to-cam engagement. With this arrangement, the peripheral path of each plate cam intersects the rotational axis of its associated follower supporting crank shaft. One pair of cams serves to impart arcuate oscillation to a lift lever associated with a carriage operable along a first linear axis and the other pair of cam members imparts arcuate oscillation to a translator lever pivotally and slidably coupled to the linearly movable shaft members for imparting linear motion to the latter along a second axis perpendicular to the first axis; such shaft members being supported by the carriage for both movement therewith and sliding movement therewithin.

8 Claims, 6 Drawing Figures

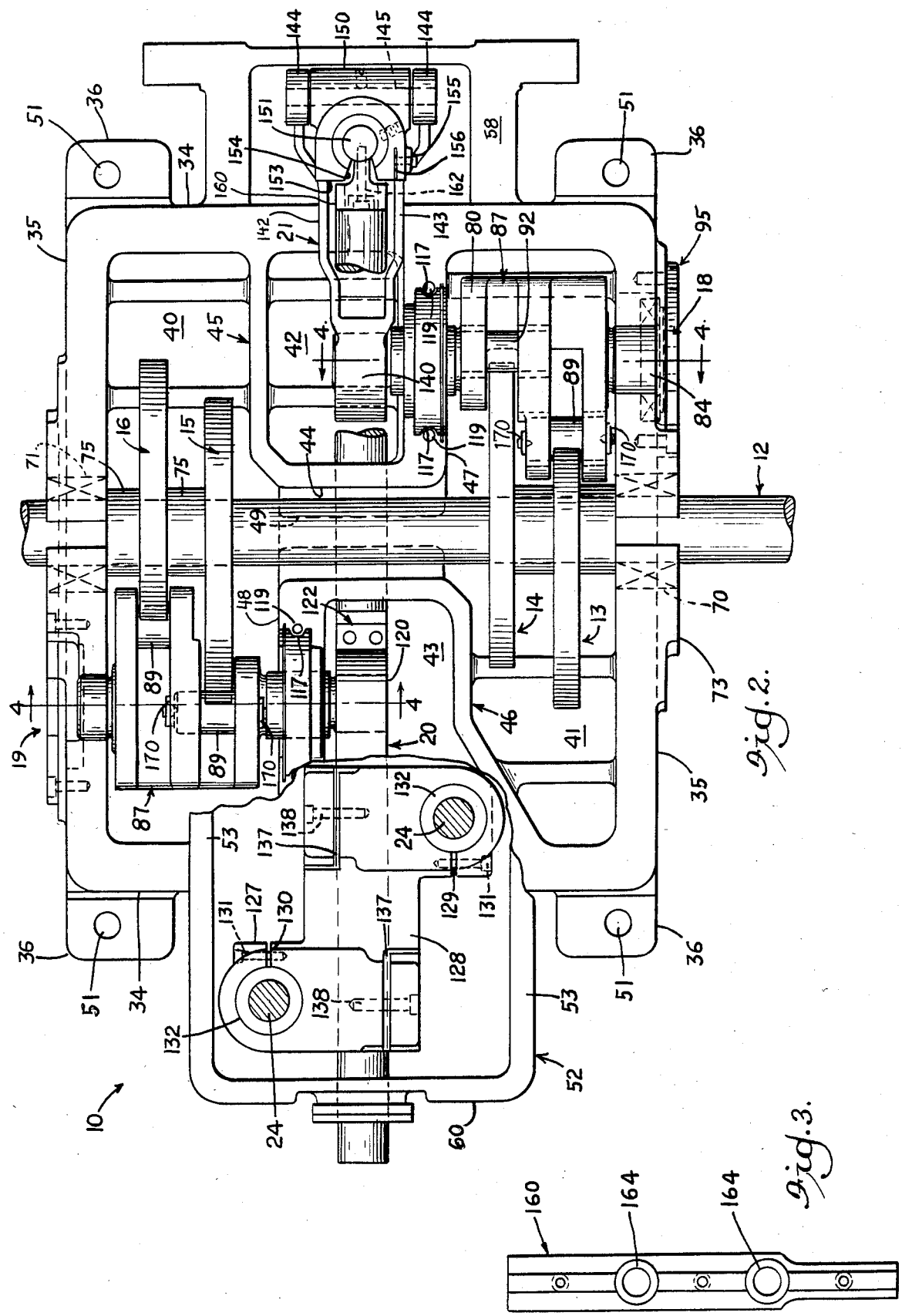

LINEAR TRANSFER DRIVE FOR A PICK AND PLACE MATERIAL HANDLING APPARATUS

This invention relates generally to precision transfer drive mechanisms and motion control devices for imparting linear motion along mutually perpendicular axes to one or more linearly movable shaft members adapted to support and impart a desired motion sequence to workpieces coupled thereto.

So-called pick and place mechanisms for material or part handling in which automated movement of parts between a supply source and a use location or work station, have become common place as the demand for automated production facilities and manufacturing economies have increased. Generally such devices utilize linearly movable shafts or rods that are activated by or off of oscillating lever arms of a cam driven mechanism whereby a workpiece is capable of being moved from one position and deposited at a remote second position with linear X-Y axis movements or combinations of such movements and/or the reverse thereof.

Prior developments of such linear pick and place mechanisms are typified by U.S. Pat. Nos. 3,751,996; 3,779,089; 3,865,253 and 4,289,040.

Among the limitations and deficiencies of such prior known devices is the general incapability of converting rotary motion of the cam means to extensive linear throw along two mutually perpendicular axes, which dictate the movement distances for workpieces coupled thereto, while maintaining a relatively compact, space saving mechanism having high load carrying capability. It is to this particular aspect of linear pick and place mechanisms and the provision of a compact drive mechanisms for actuating the same that the present invention is directed.

Briefly, this invention concerns an improved mechanical drive mechanism embodying plural plate cam members for positively driving a pair of linearly reciprocal shaft members to actuate workpiece engaging means in and along mutually perpendicular axial directions for moving workpieces between selected locations. Generally, the improved drive mechanism of this invention incorporates a single fixed-axis, unidirectionally driven input shaft to which are affixed plural cam members and a pair of parallel disposed follower shafts. The follower shafts have an offset crank configuration and carry suitable cam engaging follower means responsive to rotational movements of the cam members for imparting oscillating activity to a pair of lever arms, one arm for effecting reciprocal translation of one or more shaft or rod members in a first axial direction and the other arm for effectuating reciprocal movement of said shaft members in a second axial direction perpendicular to said first direction. Uniquely, the input shaft is established on a fixed rotational axis while the two crank follower shafts are mounted in eccentrically movable bearing assemblies whereby the follower shafts may be adjustably located and laterally positioned relative to the input shaft for purposes of adjustably engaging the follower means with each of the plate cam members. The lever arm for effecting translation of the one or more translator rods or shafts in said first direction is uniquely coupled to the latter via a slidable and pivotal connector assembly whereby to translate arcuate oscillation of the lever arm into linear translation of the shaft members. Pivotal linkage means interconnects the other lever arm with carriage means for oscillating translation along the second axis to correspondingly move said shaft members therewith. Each pair of cam members is capable of oscillating its associated offset type cam follower shaft through substantially 72° of arcuate movement to effectuate maximized linear throw of the translator shaft members to which the work engaging mechanisms are coupled. The entire mechanism is housed within a three-part housing assembly presenting a sealed sump to the operating cams and shafts whereby to permit its operation in various positions. Compactness is promoted by the unique crank shaft configuration of the follower supporting shafts. Such an offset configuration permits the maximized periphery of the plate cam members to move in and along a path which transects the rotational axis of follower shafts.

It is a primary object of this invention to provide an improved and compact intermittent motion and linear transfer drive mechanism for use with pick and place material handling apparatus.

It is another important object of this invention to provide an improved drive mechanism as set out in the preceding object in which plate cam members are employed for imparting oscillating activity to a pair of lever arms via a pair of parallel spaced follower shafts arranged so that the periphery of each cam member intersects or passes through the rotational axis of its associated follower supporting shaft.

It is still another object of this invention to provide an improved mechanism for driving one or more linearly movable shaft members along mutually perpendicular or X-Y axes in response to rotational movement of plural plate cam members.

Still another object of this invention is to provide an improved drive mechanism employing rotatably driven cam members located on a fixed rotational axis for imparting oscillating activity to a pair of parallel spaced follower shafts having a crank configuration and coupled to lever arms for linearly driving reciprocal shaft members along mutually perpendicular axes with maximized linear throw.

Still another object of this invention is to provide an improved assembly for use with workpiece handling apparatus embodying housing means definitive of a sealed lubricant sump for a drive mechanism whereby the assembly may be positioned in various operating attitudes.

Having thus described this invention, the above and further objects, features and advantages thereof will appear to those familiar with the art from the following detailed description of a preferred embodiment illustrated in the accompanying drawings and representing the best mode presently contemplated for enabling those of skill in this art to practice this invention.

IN THE DRAWINGS

FIG. 2 is a top plan view thereof, with portions of the housing broken away to show the internal arrangement of parts for the assembly shown in FIG. 1;

Figure 1:
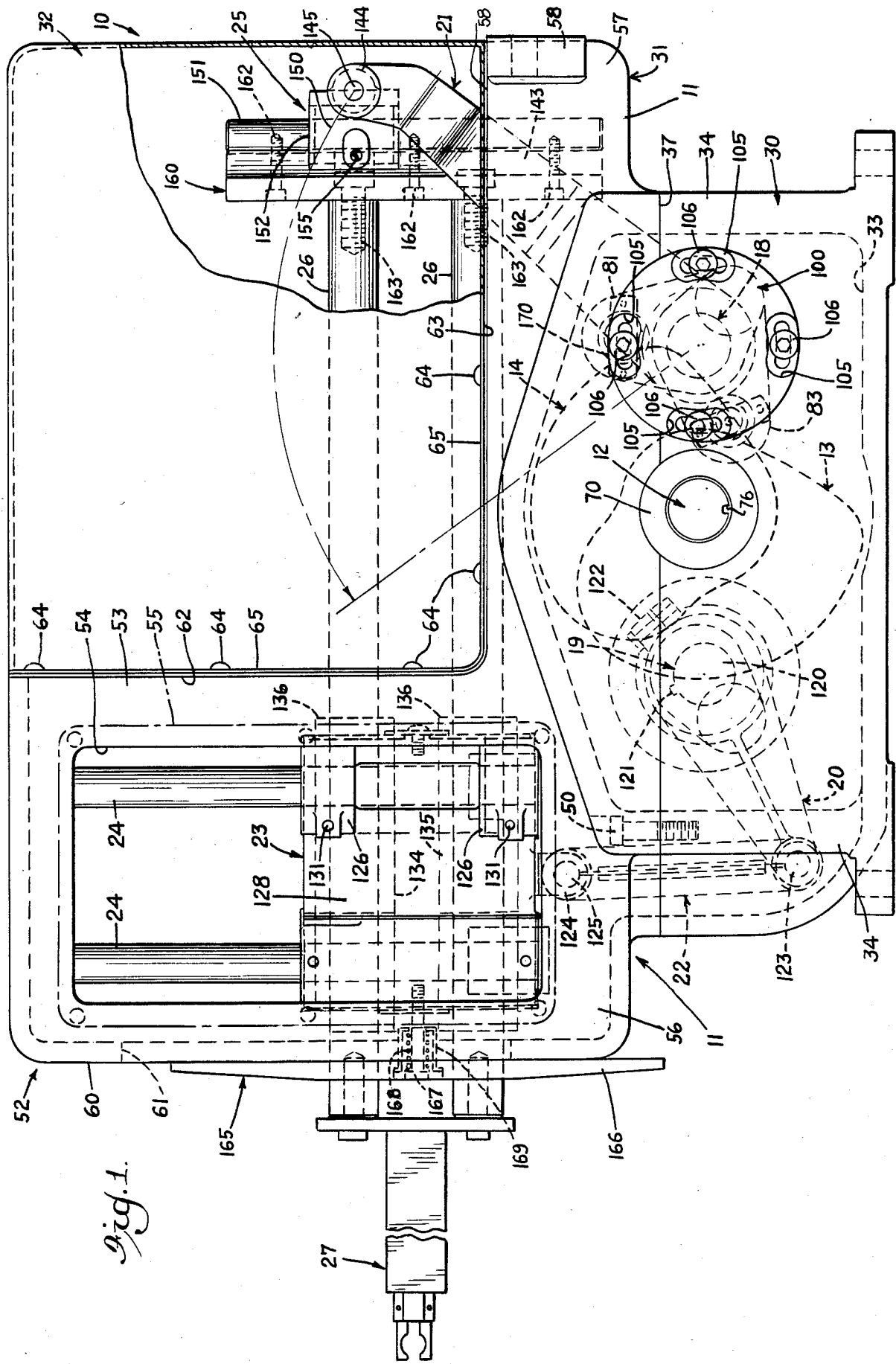
FIG. 1 is an elevational view with portions broken away to illustrate the improved drive mechanism of this invention.
Figure 4:
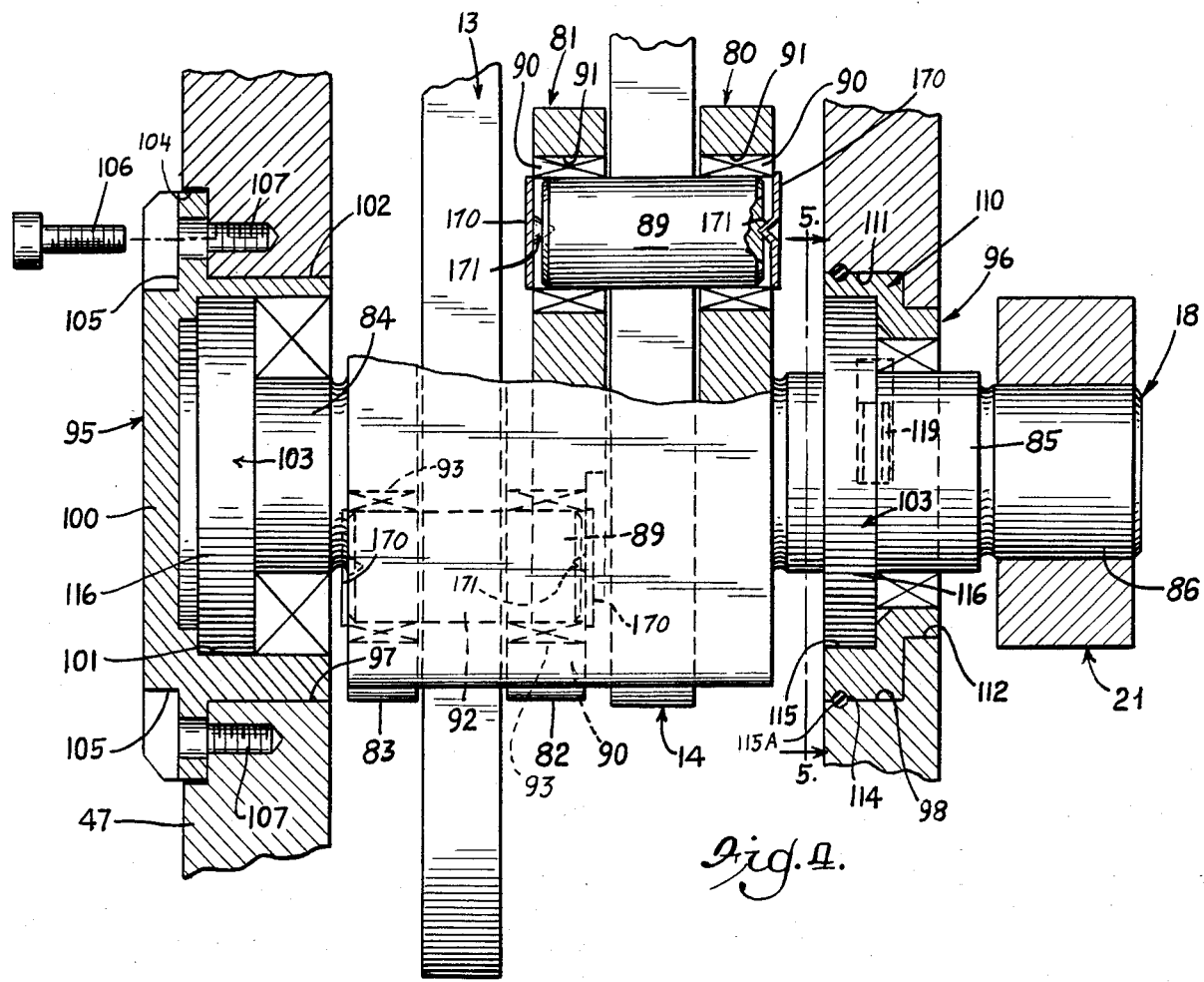
Figure 5:
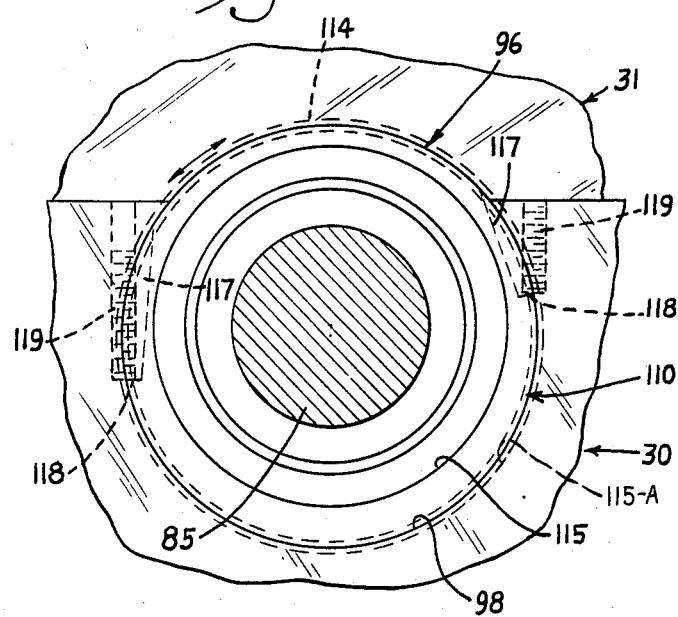
Figure 6:
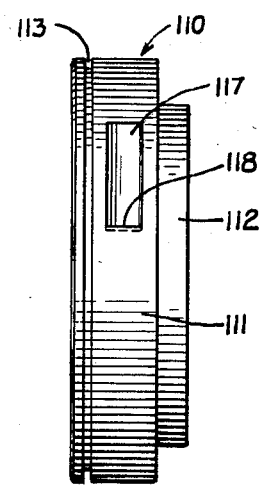

FIG. 3. is a front elevational view of a bushing block shaft support member used in the assembly of FIGS. 1 and 2;

FIG. 4 is an enlarged, partial cross-sectional view taken substantially along vantage line 4—4 of FIG. 2 and looking in the direction of the arrows thereon;

FIG. 5 is a cross-sectional view taken substantially along vantage line 5—5 of FIG. 4 and looking in the direction of the arrows thereon to illustrate the features of an eccentric bearing support for the follower shaft; and FIG. 6 is a side elevation of the bearing support shown in FIG. 5.

DESCRIPTION OF THE PREFERRED EMBODIMENT

Turning now to the features of the improved embodiment of this invention illustrated in the accompanying drawings, initial reference is made to FIGS. 1 and 2 whereat the drive mechanism or unit, indicated generally at 10, is shown to comprise a two-part housing 11, a single input shaft means 12, four plate cam members 13, 14, 15 and 16 mounted on shaft 12, a pair of crank follower shafts 18 and 19 for respectively driving a carriage lift lever 20 and a translator lever 21 with oscillating activity. The carriage lift lever is coupled via lift link 22 to a carriage block 23 supported on parallel vertically disposed guide rods 24, 24. The translator lever 21 is coupled by a bushing block assembly 25 to a pair of horizontally disposed translator shafts or rods 26, 26 which extend through the carriage block 23 and are coupled at their outer ends, exteriorly of the housing 10, to a suitable workpiece gripping assembly, indicated generally at 27.

Basically, the foregoing listed parts and elements are organized in a manner to convert the rotational action of the input shaft 12 and the several cam members 13 through 16 affixed thereto, into horizontal linear translation of the two shafts 26, 26 and vertical elevation and lowering thereof in accordance with the positioning of the carriage block 23 whereby to effectuate a desired X-Y axis motion to a workpiece held in the gripping assembly 27.

The detailed aspects and working arrangement of the several aforelisted parts and elements will now be set forth.

As best shown in FIGS. 1 and 2, the housing assembly 11 is comprised basically of three parts or sections, namely, a lower sump section 30, an upper cover section 31, and a shroud section 32.

The base sump section 30 is generally rectangular and like the cover section 31, preferably is cast of reasonably light weight material such as an aluminum alloy to comprise a bottom wall 33, parallel end walls 34, 34, and parallel side walls 35, 35 (see FIG. 2). The bottom wall 33 is provided with four mounting pads, 36, 36 at the four corners of its rectangular plan configuration. It will be appreciated, of course, that the several walls 31 through 35 thereof are integrally formed as a unitary casting. The upper edge of each of the end and side walls 34, 35 is suitably machined to effectuate a part line or surface indicated at 37 (see FIG. 1) which engages with corresponding bottom surfaces of the cover section 31 to be described hereinafter.

With particular reference to FIG. 2, it will be noted that the sump section 30 includes four internal chambers 40, 41, 42 and 43, with chambers 40 and 41 communicating via a central semi-tubular passageway 44 with the two chambers 42 and 43 confined by continuous wall portions 45 and 46 respectively. The wall portions 45 and 46 are each distinguished by a thickened side wall portion 47 and 48 respectively for bearing support purposes as will appear presently. The passageway 44 provides clearance for the drive shaft 12 and constitutes a web portion cast integrally with the wall portions 45 and 46 and preferably is provided with a tunnel passageway 49 (shown in FIG. 2) therebeneath whereby the two chambers 40 and 41 readily communicate at or near the level of the upper face for the bottom wall 33. Thus, oil or other suitable lubricant placed in chambers 40 and 41 flows readily between such two chambers to thereby constitute a splash lubrication sump for the lubrication of shaft 12 and the several plate cams and their followers.

The cover section 31 is adapted to fit over the upper end of the sump housing section 30 and to that end, while not shown herein, is formed with an internal labyrinth of walls to match the continuous wall portions 45 and 46 as well as the side and end walls of the bottom housing section 30. Thus, the two sections may be interfitted and held in superposed relation by a series of machine fasteners 50 (see FIG. 1), with the chambers 40, 41 and passageway 44 being sealed in intercommunicating relationship for containing a body of a lubricant as mentioned above. In this fashion, the lubricant is fully contained and readily adapts the unit 10 to operating in positions other than horizontal as illustrated in the drawings, i.e. a vertical or any desired angular position between the horizontal and vertical can be established. The mounting pads 36 on the lower section 30, of course, are equipped with suitable openings 51 for fasteners used in mounting the transfer drive unit 10 to a desired support in accordance with conventional practice.

In addition to the bottom face of the cover section which mates at the parting surface 37 between the housing sections 30 and 31, the latter also includes an upright, extending cage portion 52 at the left hand side thereof as viewed in FIG. 1. This cage portion has opposing side walls 53 having openings 54 to provide access to the interior of the cage portion; the same is closed by cover plates (not shown) but indicated at 55 in FIG. 1.

The cage portion 52 communicates openly at its lower end with chamber 43 and an underlying extension of the cover section indicated at 56. Cover section 31 is also equipped at its opposite end with an opening directly over the upper end of chamber 42 for passage of the translator lever arm 21 therethrough and is formed with a second portion 57, having mounting pads 58, extending beyond the right hand end wall 34 of the base section 30 (see FIG. 1).

The front end wall 60 of the cage section is formed with an elongated and generally rectangular-shaped opening 61 for passage of the translator shafts 26, 26 therethrough. Correspondingly, the rear end wall or side of the cage 52 member is open and formed with mounting flange surfaces 62 disposed parallel to the front wall 60 thereof. Additional parallel mounting flange surfaces 63 extend toward the outer right hand end of the cover section 31 whereby the generally rectangular-shaped and lighter sheet metal cover or shroud 32 may be mounted over the upper ends of the translator lever 21, the bushing block assembly 25 and shafts 26. Shroud cover 32 is removably joined to the cover section 31 as by a plurality of machine screw fasteners 64, 64 which pass through outwardly turned flange walls 65, 65 thereof and which engage surfaces 62 and 63. Thus, the entire mechanism contained within the housing assembly 11 is generally enclosed and sealed against dust and the intrusion of foreign objects, keeping the mechanism therein free and clear of unwanted debris and the like.

Turning now to the features of the drive shaft 12, it will be recognized from FIG. 2 in particular, that the same constitutes a substantially cylindrical metal shaft member rotatably carried in suitable pre-loaded tapered roller bearing assemblies 70 and 71 located in appropriate openings formed for that purpose in the side walls 35, 35 of the housing's base sump section 30. The upper portions of the openings for containing the bearing assemblies 70, 71 are formed by appropriate mating semi-circular openings of the cast cover section 31. The drive shaft 12, of course, is adapted to be associated with an appropriate source of driving power, such as a motor and gear reducer (not shown), to effect unidirectional rotation thereof. Shaft 12, as shown, is generally centrally disposed across the housing assembly 11 and passes longitudinally through the central passageway 44 of the sump section 30 and generally centrally of embossed pad formations 73 formed on the exteriors of the intermating side walls of the sump and cover sections.

As noted heretofore, the drive shaft supports a plurality of cam members, namely, four plate cam members 13 through 16, which are each formed with a cylindrical mounting hub portion 75 receptive of the drive shaft 12 therethrough. The several cam members are affixed to the drive shaft 12 as by key and key-way means indicated at 76 in FIG. 1. Thus, the plate cams 13–16 are affixed to the drive shaft and rotate therewith.

While various formations may be adopted for the peripheral contour of the several plate cams 13 through 16, in this instance, all four cams are shaped alike. However, they are mounted in alternate reverse order positions on the shaft 12 as shown best in FIG. 1, and further, are oriented at desired dispositions about the input shaft 12 to effectuate a particular oscillating activity for the levers 20 and 21.

In particular, the two plate cams 13 and 14 are associated with a single crank follower shaft 18 related to the translator lever 21 while the other two cam plates 15 and 16 are similarly associated with the second follower shaft 19 and the carriage lift lever 20; cams 13 and 14 being located in the sump chamber 41 while the lift lever cams 15 and 16 are situated in the sump chamber 40. It will be noted that each of the plate cam members 13–16 is formed with a raised lobal portion and a smaller lobal portion located at substantially different radii from the rotational axis thereof and, of course, joined together with merging peripheral surfaces defining the overall configured peripheral contour for the cam member. This relationship is best illustrated in FIG. 1 of the drawings.

Turning now to the structural aspects of the follower crank shafts 18 and 19, a description of shaft 18 will follow. Since the two shafts are identical and are related to their respective cams in the same fashion, a description of one will suffice for both.

The follower shaft 18 associated with the two plate cams 13 and 14 constitutes a short crank shaft with four lobes or eccentric extensions 80, 81, 82 and 83. Lobes 80 and 83 stand transversely outwardly of coaxial main shaft sections constituting an end hub portion 84 and stub shaft portion 85 coaxial with a mounting stub portion 86 for connection of the translator lever 21 thereto; portions 84 and 86 comprise outer end portions of the follower shaft 18. Lobes 81 and 82 on the other hand extend outwardly of an offset sub-shaft portion 87 paralleling the shaft portions 84 and 86, but located laterally to one side thereof. Each of the lobe portions is generally trapezoidal in shape with curvilinear ends (see FIG. 1) with the longitudinal axes of lobes 80, 81 angularly related to the longitudinal axes of lobes 82, 83. It further will be appreciated that the lobe portions 81 and 82 are located in the same plane and are in fact integrally formed, merging with one another, but that lobe portions 80 and 83 are separate to and axially spaced from the central lobe portions 81 and 82 to provide passage for the plate cam members 13 and 14 therebetween in operation. In fact, the axial spacing of such lobe portions and the laterally offset positioning of the shaft portion 87 is such that, in operation, the peripheries of the plate cams 13 and 14 intersect or pass through the central rotational axis for the follower shaft 18 as defined by the shaft portions 84, 85 and 86 thereof. The arrangement for shaft 19 and cams 15 and 16 is the same. This feature permits a compact and space-saving arrangement of parts distinguishing the present invention over previous devices of this general order. Further, as explained more fully later herein, it permits a maximized linear throw for the follower rods 26.

The lobe portions 80 and 81 carry a follower pin 89 extending therebetween, which is rotatably supported in suitable needle bearing assemblies 90, 90 mounted in coaxially aligned bores 91 formed near the outer ends of the two lobe portions 80 and 81 (see FIGS. 2 and 4). In a similar fashion, the two lobe portions 82, 83 carry a follower pin 92 suitably mounted in rotatable bearing assemblies 93, 93 located near the outer ends of lobe portions 82 and 83. The follower pin 89 is adapted to engage the periphery of the plate cam 14 while the follower pin 92 similarly engages the periphery of the plate cam 13. The follower pins 89, 92 are retained within their associated lobe portions by respective pairs of retainer plates 170, each having a dimple 171; the retainer plates 170 being fastened to the respective lobe portions by threaded fasteners (not shown). Thus, in response to rotational activity of the two plate caxs 13 and 14, the follower crank shaft 18 positively reacts with oscillating activity in accordance with the following response thereof occasioned by engagement of the follower pins 89 and 92 with their respective plate cams. This angular oscillation of shaft 18 is substantially 72° in the illustrated case.

Follower shaft 18 is suitably carried in rotatable bearing assemblies 95 and 96 carried in openings 97 and 98 formed in the one outer side wall 35 of the sump section and the opposing thickened side wall portion 47 of the continuous wall 46 which defines the chamber 42 in the manner shown in FIG. 2. Each of the assemblies 95 and 96 includes a suitable oil seal to prevent leakage of lubricant therepast. They also include means for eccentrically supporting the shaft portions 84 and 85 engaged thereby so as to provide adjustable means whereby the rotational axis of the follower shaft 18 may be shifted laterally with respect to the fixed rotational axis of the drive shaft 12. In this manner, effective pre-loading of the engagement pressure between the follower pins 89 and 92 and the periphery of their respectively engaged plate cam members is provided. In so doing, and noting that the pin members 89 and 92 engage their respective cam plates at arcuately spaced positions, substantially, if not all, backlash or other play between the follower means and the associated cams is eliminated. This pre-loading feature materially enhances the operating life, accuracy and dependability of a drive mechanism in accordance with this invention.

For a typical eccentrically-mounted bearing assembly 95 of the order utilized at the outer end of the follower shaft 18, that is, about the portion 84 thereof, reference may be had to U.S. Pat. No. 3,525,268 which describes a bearing system wherein an outer cap member having an eccentric bore supports a bearing means and is rotatably adjustable for laterally shifting the bearing axis, and thus the shaft which it supports. This type of assembly is shown in FIGS. 1 and 4 of the present drawings and will now be briefly described.

As shown best in FIGS. 2 and 4 of the drawings, the bearing assembly 95 is journaled in the opening 97 formed through the side wall portion 35 of the sump section and comprises a generally cylindrical bearing cap 100 which is imperforate at its outer end and acts as a sealing means to prevent the loss of lubricant therepast. The bearing cap is bored inwardly from the opposite or inner end thereof to form an internal cylindrical bore 101. A cylindrical exterior surface 102 thereof is adapted to fit into the bored opening 97. The outer end of the bore 97 is suitably counterbored at 104 to receive the enlarged peripheral flange of the cap 100 as best shown in FIG. 4. The internal bore 101 while cylindrical is eccentrically positioned relative to the outer surface 102 of the cap member and journals an anti-friction bearing assembly 103 engagingly surrounding the shaft portion 84 which it supports. The outer peripheral flange portion of the cap member 100 is provided with four arcuate slots 105 (see FIG. 2) which are receptive of machine screws 106 engageable with tapped bores 107 formed in the side wall 35; the cap fitting is substantially flush with the outer face of wall 35 by virtue of the counter bore portion 104. With this arrangement, it will readily be understood that by loosening the screws 106, the cap 100 may be arcuately rotated within the limits of the slotted openings 105 to eccentrically shift the axis of the bearing assembly 103 and thus the rotational axis of the shaft 18 relative to the fixed longitudinal axis of the input shaft 12 and the cams 13 and 14 assembled thereon. Once the appropriate lateral shifting of the crank shaft 18 has taken place, retightening of the cap screws 106 is effected to appropriately and securely pre-load the follower pins 89 and 92 on the periphery of their respective plate cams for purposes of compensating for wear and preventing play or backlash between the cams and their respective followers.

In order to correspondingly support and eccentrically adjust the inner end of the crank shaft 18, a somewhat modified eccentric bearing assembly 96 is provided which is best illustrated in FIGS. 4, 5 and 6 of the drawings. Assembly 96 comprises a bearing ring 110 which is formed with a major larger cylindrical outer surface 111 and a concentric diminished or minor cylindrical outer surface 112 which fits into correspondingly shaped counter bored opening 98 formed through the thickened wall portion 47 of the continuous wall surrounding chamber 42; the major diameter surface 111 of the ring member being received in the enlarged portion of the bored opening 98. The bearing ring 110 includes a concentric bore 115, similar to bore 101 of bearing cap 100. A suitable undercut 113 is formed inwardly of the outer surface of the larger diametered portion 111 of the ring 110 for receiving an O-ring 114. A corresponding kerf 115A is cut radially outwardly in the enlarged counter bore portion of opening 98 whereby the ring 110 is axially locked in place, but permitted to rotate. Thus, the bearing means 116 is eccentrically mounted.

In order to effect selected rotation of the ring 110 to produce a desired lateral displacement of the longitudinal axis for the crank shaft 18, the ring 110 is provided with a pair of tangential cut away openings 117 (see FIG. 5) on opposite sides thereof. Each opening 117 has a bottom shoulder 118 engageable by the lower end of a threaded adjustment screw 119 threaded through appropriate openings extending downwardly of the upper end surface of the wall portion 47. With this arrangement, by suitable axial adjustment of the screw members 119 in their respective openings, such as by tightening one screw and backing off the other, a desired rotational movement of the ring 110 takes place to accordingly laterally shift the crank shaft 18 relative to the fixed axis of the input shaft 12.

By appropriately adjusting the two assemblies 95 and 96, the desired pre-loading engagement between the follower pins and their respective cam plates is brought about; this adjustment is usually accomplished at initial assembly of the drive mechanism. Thereafter, it is only done infrequently to accommodate for normal wear between the follower rollers and their cams.

Turning now to the features of the lift lever and associated mechanisms, it will be understood from FIG. 1 in particular that the lift lever 20 is fixed to the inner end portion 120 of the follower crank shaft 19 by key and key way means 121; with the hub of the lift lever being split at one side and clamped in position by a suitable cap screw threaded between the split sections to provide a lock collar means as indicated at 122 in FIG. 1. The outer end of the lift lever 20 is joined by a transverse pivot pin 123 to the lower end of the lift link 22 which is bifurcated to provide separated arms which fit over opposite sides of the outer end of the lift lever 20. The pin 123 then passes through the bifurcated arm portions of the lift link and an appropriate opening for that purpose formed through the outer end of the lift lever.

The upper end of the lift link is similarly formed and fits over a depending ear portion 124 extending downwardly from the bottom face of the carriage block 23; with the upper end of the link 22 being affixed to the ear 124 by means of a suitable pivot pin 125 to provide a pivotal connection therebetween. From this arrangement, oscillating arcuate movement of the lift lever in accordance with the rotary oscillation of the follower crank shaft 19 effectuates vertical reciprocation of the carriage block 23 and the lift link 22.

The carriage block 23 preferably is of cast aluminum or aluminum alloy and comprises four laterally extending pad projections 126 and 127 located in superposed pairs at opposite diagonal corners of the main body 128 thereof (see FIGS. 1 and 2). Each of the pads 126 and 127 is suitably split at one side as indicated at 129 and 130, respectively (see FIG. 2). Each such split is bridged by a screw means 131 to provide a split collar formation which may be tightened about bearing bushings 132, 132, respectively, and which is receptive of one of two vertical guide rods 24, 24. Thus, a guide rod engages the carriage block 23 at the two aligned pad portions 126 or 127 thereof and is held in tight bearing engagement therewith by virtue of the interposed bushing bearings 132. The provision of the split collar formation and associated locking screw means permits pre-loading of the linear bushing bearings 132 to promote maximum stiffness and rigidity of the assembly. The positioning of the two guide rods 24 on two diagonally opposite corners of the carriage block 23 promotes strength and rigidity of structure which is reflected in increased load carrying capability of the work engaging means 27. Lubrication of the linear ball bushings 132 is brought about by sealed grease packings therein whereby the carriage block is readily movable along the parallel axes of the two guide rods 24 in response to the cranking activity of the lift lever 20.

Inasmuch as the lift carriage is primarily designed to elevate and depress the two linear translator shafts 26, it will be perceived that the main body 128 of the carriage block is provided with suitable through bore openings 134 and 135 along vertically spaced parallel axes which receive shafts 26 therethrough. More specifically, each of the openings 134 and 135, indicated in phantom lines in FIG. 2, receives a linear ball bushing or bearing 136 at each end thereof which is grease packed and sealed and whereby each shaft 26 is supported for sliding movement in two ball bushing means 136 at opposite sides of the carriage block 23. Thus, in all, the carriage block contains eight ball bushings, four to support the same on the guide rods 24 and four supporting the translator shafts 26 therein.

The ball bushings 136, like the previously described ball bushings 132 are pre-loaded by means of slotted openings 137 and threaded cap screws 138 formed and mounted in the body 128 of the carriage means 23. This preloading feature promotes rigidity of the structure to reflect an increased ability of the lift mechanism to support heavier loads. With this arrangement, it will be recognized that the translator shafts 26 move vertically with the carriage block 23 in accordance with the activity of the lift lever 20 and intermediate lift link 22.

In accordance with the present arrangement of parts, the vertical movement of the carriage block is on the order of four inches maximum, with the arrangement of the lift cams, lift lever 20 and link 22 capable of moving the carriage block 23 to any dedicated position within its four-inch maximum lift stroke depending on the design of the lift cam plates 15 and 16.

In order to effect linear translation of the two shafts 26 along an axis perpendicular to the axis of movement for the life carriage 23, as defined by the guide rods 24, 24, the translator lever 21 and the bushing block assembly 25 are provided.

Essentially, translator lever 21 constitutes a generally longer lever arm than the lift lever 20 and as noted previously, the oscillating movement of lever 21 is effectuated in response to the rotary oscillation of the follower crank shaft 18 to which the same is fixed. Specifically, the stub shaft portion 86 at the inner end of crank shaft 18 fits into an enlarged hub portion 140 formed at the lower end of lever 21. Connection of the hub portion 140 to shaft 18 is by key and key way means (not shown). In addition, the hub portion 140 is appropriately split along one side and provided with a screw means bridging such split to effect a clamping collar connection for positively affixing the hub portion 140 to the shaft end portion 86, similar to that utilized in joining lift lever 20 to its crank shaft 19.

As best shown in FIG. 2 of the drawings, the translator lever 21 is bifurcated partially along its length to provide a yoke formation which comprises separated arm portions 142 and 143, each of which terminates at its outer end in a bearing block portion 144. Further, each of the arm portions 142 and 143 is turned slightly upwardly adjacent the outer end thereof, immediately below its bearing block portion 144, to constitute a bell crank formation for the superposed and bifurcated arm portions 142 and 143.

Pivot pin means 145 is fitted through the bearing block portions 144 of the two lever arm portions 142, 143 and through an appropriate bore containing a needle bearing assembly formed through one side of a bushing block 150 of assembly 25. Thus, block 150 is rotatable relative to or about the pin means 145 to provide a pivotal interconnection between the outer end of the translator lever 21 and the bushing block assembly 25.

In addition to an opening for receiving the pin means 145, the bushing block 150 also includes a secondary opening disposed at right angles to the pin means 145 and extending therethrough for the reception of an elongated shaft member 151 journalled in a supporting bushing bearing means 152. The side or surface 153 of the block 150 furthest away from the pivot pin means 145 (see FIG. 2), is appropriately split with a V-shaped opening 154. Correspondingly, the bushing bearing 152 is also split with a matching V-shaped opening operatively aligned with opening 154. Appropriate set screw means 155 locks the bushing 152 in position to prevent its rotational movement. Such set screw means 155 cooperates with a slit opening 156 formed in the bushing block 150 to effectuate means for locking the bushing bearing in position with its V-shaped open side aligned with the V-shaped opening 154 as mentioned.

In order to interconnect the translator shafts 26 to the bushing block 150, a suitable shaft support member 160 is provided (see FIG. 3) and, as shown in FIG. 2, bears a generally T-shaped plan configuration with the outer end of the stem of the T being arcuately formed to fit against the cylindrical exterior of shaft member 151. Three machine screws 167 pass through the body and stem of the support member 160 for threading engagement with threaded bores formed at spaced locations along the length of the shaft 151. In this manner, the shaft support member 160 is affixed to the shaft 151 and the two members so intercoupled are slidingly movable relative to the bushing block 150.

In order to couple the shaft support member 160 and shaft 151 to the translator shafts 26, 26, a pair of machine screws 163, 163 pass through openings in the stem and crossbar of the T-shaped support member 160 and also into threaded axial bores formed for that purpose in the outer ends of the translator shafts 26. Two such screws 163, 163 are employed and, as shown in FIG. 3, appropriate recessed openings 164 are provided in the support member 160 for reception of the enlarged heads thereof. Thus, it will be understood that shafts 26 are coupled to the bushing block assembly 25 via the slidable shaft member 151 so that the bushing block assembly may translate vertically along the axis of the shaft 151 in response to arcuate cranking movement of the translator lever 21. This, in turn, effects responsive horizontal translating movement of the translator shafts 26, 26. This sliding interconnection between the shafts 26 and the translator lever is necessary, of course, because of the elevating activity of the carriage block 23 which surrounds and carries the shafts 26, 26 in fixed spacial relation therewith. In any event, it will be appreciated that the oscillation or cranking activities of the two levers 20 and 21 impart horizontal and vertical movement, viz., imparts X-Y movements to the shafts 26, 26 along mutually perpendicular axes in accordance with that desirable objective of this invention.

The outer ends of the shafts 26, or, that is, the ends not associated with the bushing block assembly 25, are attached to the workpiece engaging assembly 27 of conventional and known structure. Such workpiece gripping assembly constitutes no particular part of this invention other than as a means for engaging workpieces to be moved in response to the activity of the translator shafts 26, 26.

It is to be noted that in accordance with the approximately 72° rotary oscillation or arcuate motion for the translator lever 21, the shafts 26, 26 have a maximum horizontal throw of approximately ten inches for the illustrated mechanism. Thus, conversion of rotary or arcuate motion of the translator lever into linear motion may be imparted to the two linear translator shafts 26, 26 to move the same to any dedicated position within the ten-inch horizontal stroke maximum thereof. The exact linear throw can be achieved in accordance with selected design of the plate cams 13 and 14, all in a well-known manner.

In order to maintain the interior of the cage portion 52 relatively free of dust, dirt and debris, a unique dust cover assembly 165 is provided over the front opening 61 therein along which the two translator shafts 26, 26 move vertically. To that end, assembly 165 comprises an elongated nylon shield member 166 having openings for the passage of the translator shafts 26, 26 therethrough and of a length slightly longer than the length of the opening 61 in the cage wall 60. Shield member 166 is, of course, fitted over the outer ends of the translator shafts and is centrally joined, as by a screw means 167, to the opposing end face or wall of the carriage block 23; the screw 162 threading into the carriage block and being surrounded by a compression spring 168 engaging the bottom of a cup member 169. Thus, engaging pressure between the shield member 165 and the front face 60 of the cage section 52 may be regulated and adjusted by threadingly adjusting the screw means 167. By this expedient, the interior of the cage is substantially sealed-over during operation to prevent the entry of dust, dirt and foreign objects with the assembly 165 being movable with and in accordance to the vertical oscillating activity of the two translator shafts 26, 26.

From the foregoing, it is believed that those familiar with the art will readily recognize and appreciate the novel departure of the present invention over previous devices of this general class and will particularly note that the arrangement of parts, including the crank type follower shaft, permits a longer reach or horizontal translation for the shafts 26, 26, with reduced or shorter arm length for gripping means 27 while maintaining improved overall load capability, reduced overall housing size and improved compactness of parts than has heretofore been known in devices of this class. More specifically, the particular type of cam used and the relationship of cam axis to follower axis for use with the herein-disclosed crank follower shaft can be varied without departing from the scope of the present invention.

Further, it will be understood that while the present invention has been described in association with a particular preferred embodiment illustrated in the accompanying drawings and described hereinabove, the same is susceptible to wide variation, modification and substitution of equivalents without departing from the spirit and scope of this invention which is intended to be unlimited by the foregoing except as may appear in the following appended claims.

The embodiments of the invention in which an exclusive property or privilege is claimed are defined as follows:

1. In a mechanical drive mechanism, the combination comprising:

a housing, an input drive shaft adapted to be rotatably driven about a fixed axis traversing said housing, plural pairs of parallel plate cam means fixed to said drive shaft for rotation therewith, a pair of offset follower crank shafts rotatably mounted within said housing, cam follower means carried on each said offset crank shaft for engaging an associated pair of said plate cam means whereby to simultaneously and positively arcuately oscillate said offset crank shafts in response to rotational activity of said plural pairs of parallel plate cam means and drive shaft; said offset follower crank shafts operable to permit said plural cam means to transect the rotational axes of their respectively associated offset follower crank shafts in operation.

2. The combination of claim 1, wherein the plate cams of each pair of said parallel plate cam means are alternatively reversely positioned on said offset follower crank shafts, with the plate cams of each pair being engaged by individual follower means which are arcuately spaced from one another on the associated said offset follower crank shaft, and said offset follower crank shafts are mounted on axes paralleling the axis of said drive shaft.

3. The combination of claim 1, and means rotatably supporting said offset follower crank shafts comprising eccentrically adjustable means operable to laterally adjust the rotational axis of each said offset follower crank shaft relative to the fixed rotational axis of said drive shaft for the purpose of regulating the pressure of engagement between said cam means and said follower means.

4. The combination of claim 1, and a lift lever affixed to one of said offset follower crank shafts for oscillation therewith, and a translator lever affixed to the other said offset follower crank shaft for oscillation therewith.

5. The combination of claim 4, and carriage block means pivotally coupled to the arcuately movable end of said lift lever, a pair of parallel superposed translator shafts, means pivotally and slidably coupling said translator shafts to the arcuately movable end of said translator lever, means slidably supporting said block means for movement along a first linear axis, and means on said block means supporting said translator shafts for linear receprocation therethrough and along a second movement axis perpendicular to said first axis.

6. The combination of claim 5, wherein said means pivotally and slidably coupling said translator shafts to said translator lever comprises a bushing block, linear pin means pivotally interconnecting said bushing block to said translator lever, a shaft member slidably supported in said bushing block for movement along an axis perpendicular to the axis of said pin means, a shaft support means rigidly affixed parallel to said shaft member for movement therewith and relative to said bushing block, and means fixing said support means to said translator shafts whereby to convert arcuate oscillation of said translator lever into linear reciprocation of said translator shafts.

7. The combination of claim 6, wherein said translator lever comprises a pair of bifurcated arms extending outwardly from the said other crank shaft, the separated ends of said arms straddling opposite sides of said bushing block and said linear pin means passing through said bushing block and said separated ends.

8. In a mechanical drive mechanism for pick and place material handling apparatus, the combination comprising:

a housing, an input drive shaft adapted to be rotatably driven about a fixed axis traversing said housing, plural pairs of parallel spaced plate cam means fixed to said drive shaft for rotation therewith, a pair of offset follower crank shafts mounted on axes paralleling the axis of said drive shaft, plural cam follower means rotatably carried on each said offset crank shaft for rotatably engaging the peripheries of an associated pair of said cam means whereby to simultaneously and positively arcuately oscillate said offset crank shafts in response to rotational activity of said cam means and drive shaft; the peripheries of said cam means transecting the rotational axes of their respectively associated offset follower crank shafts in operation.

* * * * *